United States Patent
Baker

(10) Patent No.: US 6,932,238 B2
(45) Date of Patent: Aug. 23, 2005

(54) NON-REFILLABLE VALVE DEVICE

(75) Inventor: George D. Baker, Cambridge, MD (US)

(73) Assignee: Air Liquide Advanced Technologies U.S. LLC, Wilmington, DE (US)

(*) Notice: Subject to any disclaimer, the term of this patent is extended or adjusted under 35 U.S.C. 154(b) by 222 days.

(21) Appl. No.: 10/405,930

(22) Filed: Apr. 3, 2003

(65) Prior Publication Data

US 2004/0144803 A1 Jul. 29, 2004

Related U.S. Application Data

(60) Provisional application No. 60/443,059, filed on Jan. 28, 2003.

(51) Int. Cl.[7] .............................................. B65D 47/02
(52) U.S. Cl. ..................... 222/1; 222/147; 222/400.7; 222/402.1; 222/402.16; 215/19
(58) Field of Search .................... 222/1, 147, 400.7, 222/402.1, 402.16; 215/18, 19; 141/351; 137/614.2; 251/82, 83

(56) References Cited

U.S. PATENT DOCUMENTS

| | | | |
|---|---|---|---|
| 3,552,342 A | | 1/1971 | Brown |
| 4,813,575 A | * | 3/1989 | O'Connor ................... 222/147 |
| 5,018,552 A | | 5/1991 | Politi et al. |
| 5,295,502 A | | 3/1994 | Lane |
| 5,305,925 A | | 4/1994 | Vogel |
| 5,383,487 A | | 1/1995 | Home |
| 5,400,920 A | * | 3/1995 | Barnhart ......................... 222/1 |
| 5,467,798 A | | 11/1995 | Baker et al. |
| 5,657,790 A | | 8/1997 | Mohn |
| 5,794,660 A | | 8/1998 | Mohn |

FOREIGN PATENT DOCUMENTS

| | | |
|---|---|---|
| FR | 2 655 955 A1 | 12/1989 |
| GB | 2 329 703 A | 9/1997 |

* cited by examiner

*Primary Examiner*—Michael Mar
*Assistant Examiner*—Patrick Beuchner
(74) *Attorney, Agent, or Firm*—Linda K. Russell

(57) ABSTRACT

A non-refillable valve device includes a housing with an axially extending internal cavity, where the internal cavity includes a chamber extending to an end of the housing. The housing is securable to a container to facilitate fluid communication between the container and the housing chamber. A plug member is secured within the housing chamber to provide a fluid flow passage between the container and the housing chamber when the housing is secured to the container, and an elastic sealing member is also disposed within the chamber. The sealing member is displaceable from a first position to a second position within the chamber, where the sealing member in the first position permits fluid flowing into the valve device to flow through the fluid flow passage and into the container, and the sealing member in the second position substantially prevents fluid flow through the fluid flow passage and into the container. A valve stem is preferably secured and axially displaceable within the internal cavity of the housing to effect movement of the sealing member from the first position to the second position.

17 Claims, 6 Drawing Sheets

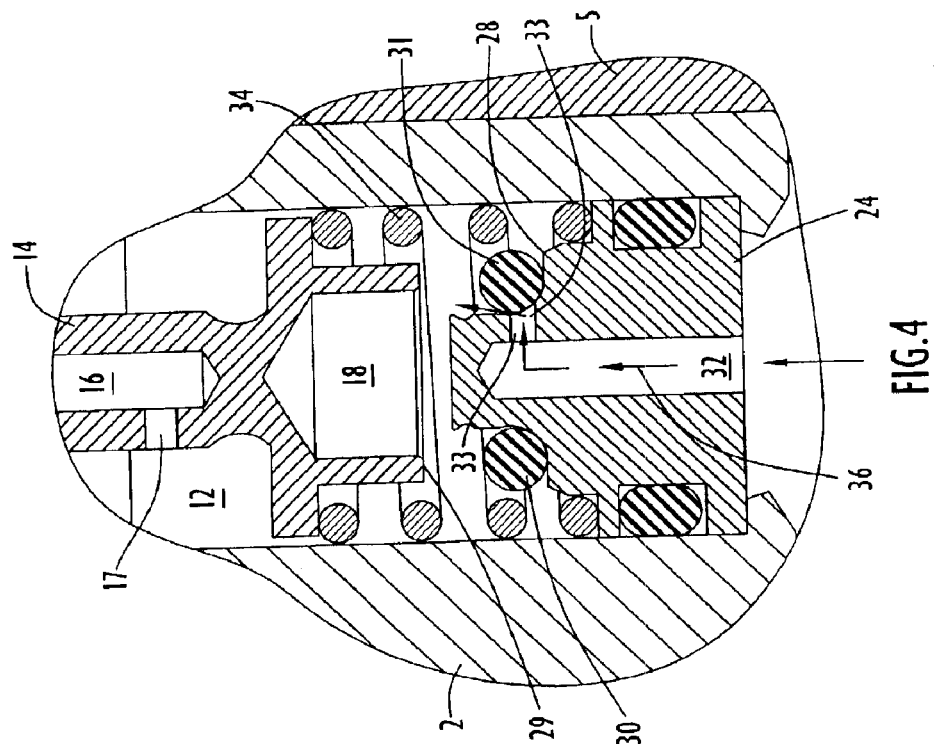
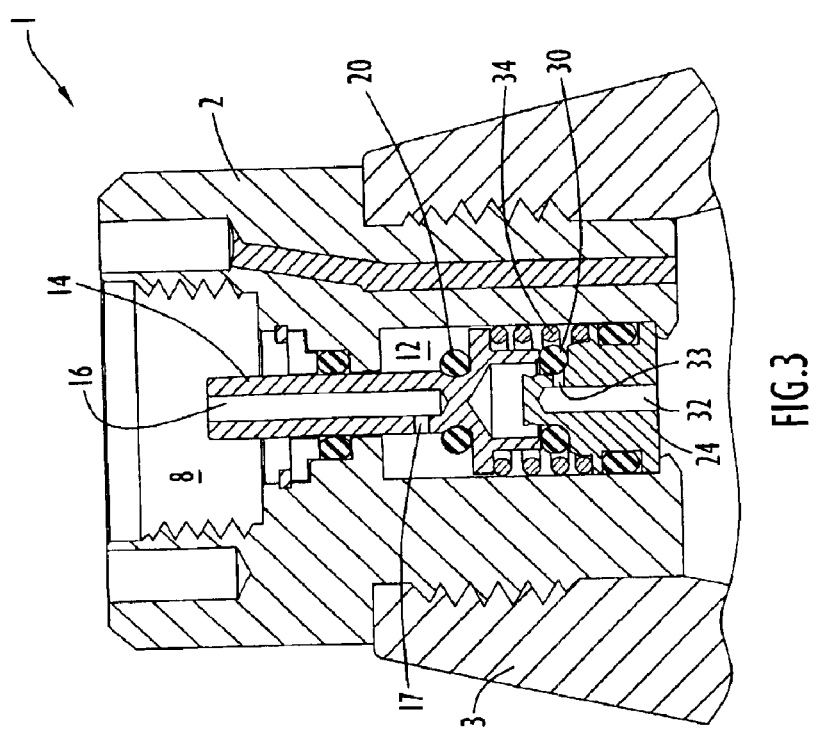

NON-REFILLABLE VALVE DEVICE

CROSS REFERENCE TO RELATED APPLICATIONS

This application claims priority from U.S. Provisional Patent Application Ser. No. 60/443,059, entitled "Valve For Non-refillable Service", and filed Jan. 28, 2003. The disclosure of this provisional patent application is incorporated herein by reference in its entirety.

BACKGROUND OF THE INVENTION

1. Technical Field

The present invention pertains to valve devices. In particular, the present invention relates to valve devices that prevent refilling of fluids into containers.

2. Discussion of the Related Art

Many cylinders or containers that store releasable fluids are designed for a single-fill use. In particular, such containers may be required by government regulation to include a refill prevention valve so as to ensure single-fill use of the container.

Various valve devices are presently known that prevent refilling of a container with a fluid. Many of these refill prevention valve devices are initially operable to permit filling of the container, and then a check valve mechanism is activated within the valve device that permits release of fluid within the container but prevents refilling of the container. Exemplary valve devices with refill prevention check valve mechanisms are described in U.S. Pat. Nos. 5,018,552, 5,295,502, 5,383,487, 5,467,798 and 5,657,790, the disclosures of which are incorporated herein by reference in their entireties.

Conventional refill prevention valves are typically complex mechanical devices that require several components to effect the deployment of a check valve mechanism after initial filling of the container to which the valve device is secured.

A refill prevention valve device is desirable that is simple in design and requires few working components to effect deployment of a check valve mechanism of the valve device.

OBJECTS AND SUMMARY OF THE INVENTION

Accordingly, it is an object of the present invention to provide a valve device that permits a single filling of a container and prevents subsequent refilling of the container.

It is another object of the present invention to provide a non-refillable valve device that is simple and requires a minimal number of operating components to effect deployment of a check valve mechanism within the device and thus a non-refillable valve function.

The aforesaid objects are achieved individually and/or in combination, and it is not intended that the present invention be construed as requiring two or more of the objects to be combined unless expressly required by the claims attached hereto.

According to the present invention, a non-refillable valve device includes a housing with an axially extending internal cavity, where the internal cavity includes a chamber extending to an end of the housing. The housing is securable to a container to facilitate fluid communication between the container and the housing chamber. A plug member is secured within the housing chamber to provide a fluid flow passage between the container and the housing chamber when the housing is secured to the container, and an elastic sealing member is also disposed within the chamber. The sealing member is displaceable from a first position to a second position within the chamber, where the sealing member in the first position permits fluid flowing into the valve device to flow through the fluid flow passage and into the container, and the sealing member in the second position substantially prevents fluid flow through the fluid flow passage and into the container. A valve stem is preferably secured and axially displaceable within the internal cavity of the housing to effect movement of the sealing member from the first position to the second position.

Thus, a check valve mechanism is effectively achieved by coupling the sealing member with the plug member after filling of the container so as to permit flow of fluid from the container through the valve while preventing fluid flow from the housing chamber into the container and thus refilling of the valve. The sealing member preferably expands or compresses radially to permit fluid flow from the container to the housing chamber and through the valve when the sealing device is in the second position.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

BRIEF DESCRIPTION OF THE DRAWINGS

FIG. 3 is a cross-sectional view of the valve device of FIG. 1 with the valve stem axially displaced to a position that activates a check valve mechanism of the valve device in accordance with the present invention.

FIG. 4 is an enlarged view in cross-section of a portion of the valve device of FIG. 1 with the check valve activated and the valve stem displaced to a position that permits one-way flow of fluid from the container through the valve device.

DETAILED DESCRIPTION OF THE PREFERRED EMBODIMENTS

A non-refillable valve device is provided that includes a single elastic sealing member that serves as a check valve mechanism for the valve device. As used herein, the term check valve mechanism refers to a valve mechanism of the valve device that permits fluid flow through the valve device in only a single direction. In particular, when the check valve mechanism is activated for the valve device of the present invention, the valve device permits fluid to flow from a container to which the valve device is connected and through the valve device to a desired destination but prohibits fluid from flowing from the valve device into the container. Activation of the check valve mechanism is accomplished by moving the sealing member from a first position to a second position within the valve to effect a sealing closure about a valve port and/or passage that communicates with the container opening. The sealing member preferably expands or compresses radially to effect at least partial opening of the valve port and/or passage and permit fluid to escape from the container during valve operation as described below.

Figure 1:
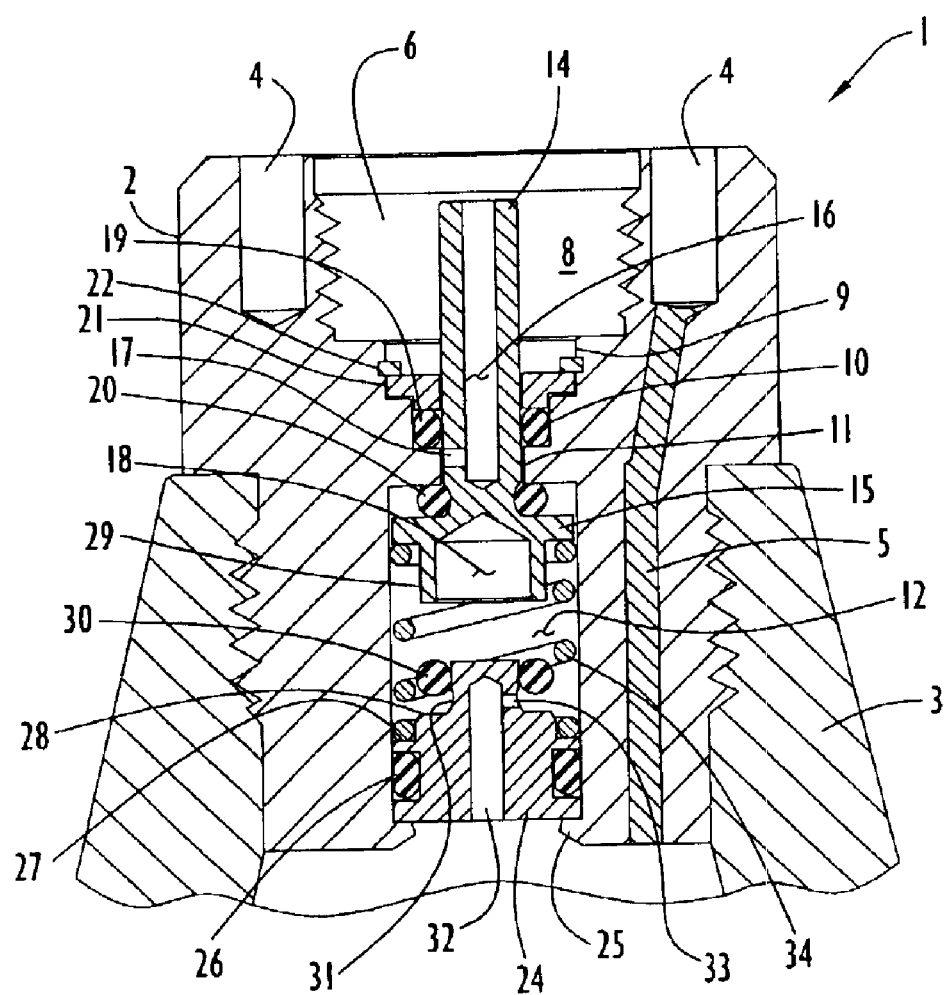
FIG. 1 is a cross-sectional view of a non-refillable valve device in accordance with the present invention.

Referring to FIG. 1, a valve device 1 includes a housing 2 having a generally T-shaped longitudinal cross-sectional geometry that is defined by an upper housing portion and a lower housing portion. A central cavity 6 extends axially within the housing between its longitudinal ends and receives and retains valve components as described below. The valve housing and other valve components may be constructed of any conventional or other materials (e.g., metal, plastics and/or polymers) that meet valve specifications for a particular application. In addition, any type or types of fluids (e.g., gases and/or liquids) may be utilized with the valve device of the present invention.

The lower housing portion includes external screw threads to facilitate threaded and fluid tight sealing engagement within a threaded opening of container 3. Alternatively, it is noted that any other suitable fluid tight sealing engagement (e.g., welding, bonding, etc.) may be provided to secure the valve device with the opening of the container. Shallow wells 4 extend longitudinally into a top surface of housing 2 between the central cavity and the outer periphery of the housing. At least one well 4 includes a channel 5 that further extends from the well to a bottom surface of the valve housing, thus defining a passage between the longitudinal ends of the housing. Each channel 5 provided on the valve housing is filled with a low melting alloy or other suitable material to establish a safety relief plug for the valve device in the event of an excessive pressure (e.g., caused by heating) within the container to which the valve device is secured.

Central cavity 6 of the valve housing includes an upper cavity section 8 that extends from the valve housing top surface to an intermediate cavity section. The intermediate cavity section is reduced in dimension by a series of three radially extending internal shoulders 9, 10 and 11. The internal shoulders increase in radial dimension in a stepped manner toward the lower portion of the valve housing, with shoulder 11 defining the narrowest radial dimension or gap of the intermediate cavity section at its lower end. The lower cavity section forms a chamber 12 that extends between internal shoulder 11 of the intermediate cavity section and an opening at the valve housing bottom surface.

A valve stem 14 is positioned within central cavity 6 and includes a generally cylindrical upper portion extending through the intermediate cavity section and into upper cavity section 8 and a lower portion extending into chamber 12. The radial gap or cavity space at shoulder 11 is slightly larger than the diameter of the valve stem upper portion to permit limited axial movement of the valve stem within cavity 6 as described below. The lower portion of the valve stem includes a radially extending flange 15 that is larger in radial dimension than the cavity space at internal shoulder 11 yet slightly smaller than the transverse cross-sectional dimension of chamber 12 to permit the flow of fluid within the chamber and around the flange during operation of the valve device.

A central passage 16 extends axially within the valve stem upper portion from an opening at a top surface of valve stem 14 to a terminal point within the valve stem near the location of flange 15. A port 17 extends transversely from passage 16 near its terminal point through an outer peripheral wall section of the valve stem to facilitate fluid communication between passage 16 and chamber 12 when the valve stem is axially displaced in a manner as described below. The lower portion of the valve stem below flange 15 has a transverse cross-sectional dimension that is larger than the diameter of the valve stem upper portion and includes a central hollow portion 18 that extends axially from the valve stem bottom surface to a terminal location within the valve stem that is located near but not reaching the terminal point of central passage 16. Thus, hollow portion 18 and central passage 16 do not communicate with each other.

A fluid tight seal is established between valve stem 14 and portions of cavity 6 by providing resilient sealing members, such as O-rings, that surround outer peripheral portions of the valve stem. In particular, a first sealing member 19 is secured around the periphery of the valve stem upper portion within the intermediate cavity section at the radial gap or cavity space formed by shoulder 10. The first sealing member is further pressed against a top surface of shoulder 11 by a retaining ring 21 and a circlip 22 which are also secured within the intermediate cavity section at shoulders 9 and 10. Retaining ring 21 includes a central opening that is similar in dimension to the radial gap formed at shoulder 11 and is slightly larger in diameter than the diameter of the valve stem upper portion to permit limited axial movement of the valve stem within cavity 6. Sealing member 19 is suitably dimensioned to frictionally engage the outer peripheral surface of the valve stem upper portion so as to provide a fluid tight seal while permitting axial movement of the valve stem. A second sealing member 20 is secured about a groove extending around the outer periphery of valve stem 14 located between flange 15 and port 17. The second sealing member is further disposed within chamber 12 and has an outer diameter that is larger than the radial gap at annular shoulder 11 to prevent sealing member 20 from passing from chamber 12 into the intermediate cavity section. When the valve stem is axially displaced within cavity 6 to a position where second sealing member 20 abuts a bottom surface of shoulder portion 11, as illustrated in FIG. 1, fluid communication between chamber 12 and port 17 of the valve stem is effectively prevented as a result of port 17 being located within the intermediate portion of cavity 6 as well as a fluid tight seal being provided by the second sealing member as it engages shoulder 11.

The check valve mechanism for valve device 1 includes a plug member 24 secured in chamber 12 at the lower portion of the valve housing and engaging an internally extending annular ridge or lip 25 provided at the opening defined at the valve housing bottom surface. The lower portion of plug member 24 (i.e., the portion that engages annular lip 25) is sufficiently dimensioned to frictionally engage the internal housing walls defining chamber 12 so as to prevent axial movement of the plug member within chamber 12 as well as provide a fluid tight seal between the peripheral walls of the plug member lower portion and the engaging wall portions of chamber 12. Optionally, the plug member may be bonded, welded or secured in any other suitable manner within the chamber to prevent its movement and maintain an effective seal during operation of the valve device. An elastic and resilient sealing member 26 (e.g., an O-ring) is provided within a groove extending around an outer peripheral section of the plug member lower portion to ensure a fluid tight seal is maintained at the interface between the plug member lower portion and chamber 12.

The plug member tapers from the lower portion to an intermediate portion, thus forming a shoulder 27 between the lower and intermediate portions, and further tapers from the intermediate portion to an upper portion, thus forming a shoulder 28 between the intermediate and upper portions. Disposed about a shallow groove extending around the outer periphery of the plug member upper portion near its top surface is a resilient and elastic sealing member 30 (e.g., an O-ring). The upper portion of the plug member further includes a retaining groove 31 extending around the outer periphery of the plug member upper portion and disposed between the shallow groove and shoulder 28. Retaining groove 31 has a greater depth than the shallow groove in which sealing member 30 is disposed and is configured to receive and retain sealing member 30 once the check valve mechanism has been activated as described below.

The upper portion of the plug member is sufficiently dimensioned to be at least partially received within hollow portion 18 of valve stem 14 when the valve stem is displaced toward plug member 24 as described below (e.g., see FIG. 3). Sealing member 30 is too large to fit within hollow portion 18, and is instead pushed by an annular wall section 29 of the valve stem when the valve stem is brought in contact with sealing member 30 during its downward descent. Specifically, sealing member 30 is forced by annular wall section 29 from its shallow groove to move along the outer periphery of the plug member upper portion and into retaining groove 31. The intermediate portion of plug member 24 is sufficiently dimensioned to provide a stop for both sealing member 30 and annular wall section 29 at shoulder 28, thus preventing further axial displacement of the valve stem toward the plug member. At this stop point, sealing member 30 is secured within retaining groove 31.

A central passage 32 extends axially into plug member from its bottom surface to a terminal location within the plug member upper portion that is removed from the plug member top surface (i.e., passage 32 does not extend to the plug member top surface). A port 33 extends transversely from central passage 32 and emerges at the outer periphery of the plug member within retaining groove 31. As can be seen in FIG. 1, passage 32 is in fluid communication with the interior of container 3 and facilitates the flow of fluid, via port 33, between chamber 12 of valve cavity 6 and the container.

A resilient biasing member is provided within chamber 12 to bias the valve stem toward cavity shoulder 11 in a resting position for the valve device (FIG. 1). In particular, a biasing member 34 is provided in the form of a coil spring, with the coil diameter of the biasing member being sufficiently dimensioned to extend around the intermediate and upper portions of plug member 24 as well as annular wall section 29 of valve stem 14 so as to engage, at its opposing ends, with valve stem flange 15 and plug member shoulder 27.

Figure 1A:
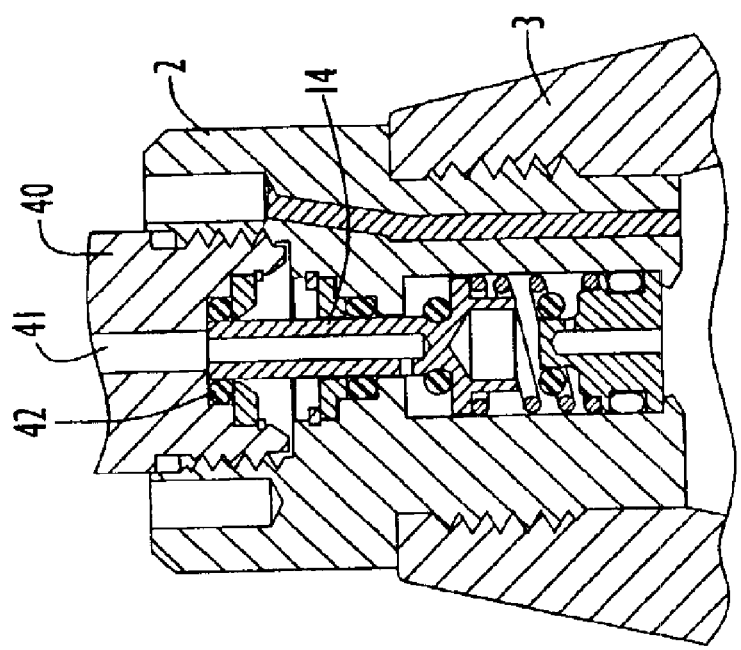
FIG. 1a is a cross-sectional view of the valve device of FIG. 1 including a rotating handle to effect axial movement of a valve stem of the device in accordance with the present invention.

A number of conventional or other types of valve actuation devices may be employed, during operation of the valve device, to axially displace valve stem 14 from its resting position (FIG. 1) to a position where the valve stem is brought closer to the plug member. A sufficient amount of the upper portion of the valve stem extends into upper cavity section 8 to permit coupling of the valve stem to a valve actuation device in order to effect axial movement of the valve stem by the actuation device. In an exemplary embodiment depicted in FIG. 1a, a rotating handle 40 is coupled to valve stem 14 and housing 2 in a conventional manner, with external threads on handle 40 engaging with internal threads in the upper cavity section to facilitate axial movement of the valve stem in a desired direction with corresponding rotations of the handle. A central passage 41 is provided in handle 40 that communicates with valve stem passage 16, and a resilient member 42 (e.g., an O-ring) is disposed to provide a fluid tight seal at the interface between the handle and the valve. It is to be understood that the valve device of the present invention is also readily adaptable for use with a variety of other valve actuation devices (e.g., pump type, aerosol or other spray type, tire valve type, etc.), where the actuation device includes a fluid passage that communicates with the valve stem passage.

Operation of valve device 1 is described with reference to FIGS. 1–4. Prior to valve actuation, valve stem 14 is biased in the resting position illustrated in FIG. 1. In particular, the valve stem is biased by resilient biasing member 34 to a position removed from plug member 24 such that port 17 is disposed within the intermediate portion of valve cavity 6 and is not in fluid communication with chamber 12. Sealing member 20 engages the bottom surface of cavity shoulder 11, ensuring a fluid tight seal between port 17 and chamber 12. In addition, prior to an initial filling of container 3, sealing member 30 is disposed along the shallow groove of the plug member upper portion and port 33 of the plug member is readily exposed and in fluid communication with chamber 12.

Figure 2:
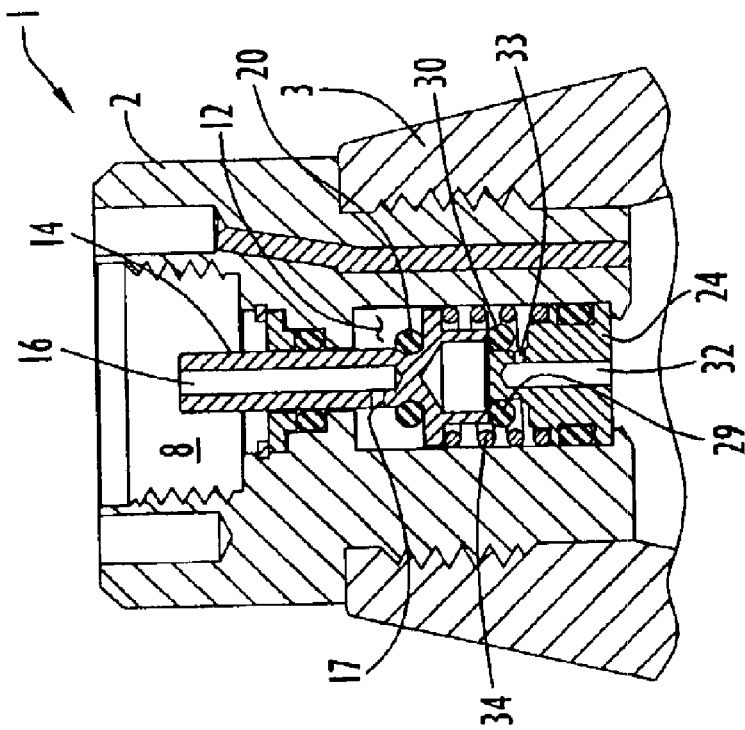
FIG. 2 is a cross-sectional view of the valve device of FIG. 1 with the valve stem axially displaced to a position that permits filling of a fluid into a container connected with the valve device in accordance with the present invention.

To fill the container, valve stem 14 is displaced by applying a force to the top surface of the valve stem by a valve actuation device (e.g., the actuation device depicted in FIG. 1a) to overcome the biasing force of biasing member 34. The actuation device displaces the valve stem a selected distance toward plug member 24, as depicted in FIG. 2, such that port 17 is exposed within and in fluid communication with chamber 12. In this position, container 3 may be filled with fluid by directing fluid through a passage in the actuation device to valve stem passage 16, through the valve stem passage and port 17 and into chamber 12. The fluid flows in chamber 12 to exposed port 33 on the plug member, into passage 32 and then into container 3. As indicated in FIG. 2, biasing member 34 is compressed during axial displacement of the valve stem, and release of the force applied to the valve stem by the actuation device will result in the valve stem resuming its biased position as set forth in FIG. 1.

One or more pressure and/or other suitable sensors may be provided at suitable locations (e.g., within the container and/or fluid supply source, etc.) to provide an indication that filling of the container is complete. Once the container has been completely filled, the check valve mechanism is activated by displacing valve stem 14 further toward plug member 24, as depicted in FIG. 3, so as to push sealing member 30 from the shallow groove along the peripheral surface of the plug member upper portion and into retaining groove 31. Filling of the container as well as activation of the check valve mechanism may be manual or automated. In an automated embodiment, the valve stem is automatically displaced toward the plug member by the valve actuation device (e.g., to a position as depicted in FIG. 2), utilizing appropriate processors or controllers, to effect filling of the container. When a threshold pressure and/or other sensed condition is achieved, the valve stem is further displaced by the valve actuation device to engage the sealing member and force it to move along the plug member and into the retaining groove. The force applied to the valve stem is then released, resulting in the valve stem being displaced by the biasing member back to its original, resting position (FIG. 1).

After activation of the check valve mechanism and bringing the valve stem back to its resting position, valve device 1 prevents fluid within the container from being released through the valve stem due to port 17 being disposed within the intermediate cavity section of housing 2 and sealing member 20 providing an effective seal at cavity shoulder 11 (i.e., the lower boundary of the intermediate cavity section). Further, the displacement of sealing member 30 to retaining groove 31 on plug member 24 effects a sealing closure of port 33 that prevents any refilling of container 3. For example, if valve stem 14 is displaced to a position in which valve stem port 17 is in fluid communication with chamber 12 (FIG. 2), any fluid injected through valve stem passage 16 and into chamber 12 is prevented from entering plug member port 33, and thus into container 3, due to sealing member 30 covering and providing an effective seal at port 33. Attempts at forcing fluid from chamber 12 into container 3 are ineffective because such fluid force maintains a fluid tight seal by sealing member 30 against port 30 to prevent the fluid from entering this port.

However, fluid may be easily released from container 3, to the ambient environment or other desired destination outside of the container which is at a lower pressure than the pressure within the container, by displacing valve stem 14 to the position where valve stem port 17 is in fluid communication with chamber 12 (see FIG. 4). In particular, when container 3 contains a sufficient amount of fluid, the fluid pressure within container 3 effects a slight radial expansion of sealing member 30 away from retaining groove 31, releasing the fluid tight seal and creating a small passage for fluid to escape from container 3 into passage 32, through plug member port 33 and into chamber 12 (indicated generally by arrows 36 in FIG. 4). Fluid within chamber 12 then travels into valve stem port 17, and through valve stem passage 16 and the corresponding passage in the valve actuation device to the desired delivery destination for the fluid. Upon displacement of the valve stem back to its resting position (FIG. 1), fluid is prevented from leaving chamber 12 as a result of valve stem port 17 no longer being in fluid communication with chamber 12. Thus, fluid may be removed from the container in any selected amount (e.g., continuously, in discrete plug volumes, etc.) depending upon when and how often the valve stem is displaced to a position that facilitates fluid communication between valve stem port 17 and chamber 12.

The elasticity and resiliency of the sealing member for the check valve mechanism may be selected (e.g., by sealing member design, choice of elastomers and/or other materials of construction for the sealing member, etc.) based upon a number of factors including, without limitation, valve design and dimensions, container design and dimensions, selected threshold pressures necessary to achieve a desired radial expansion and/or compression of the sealing member, etc. Preferably, the sealing member is suitably constructed to permit a selected majority of fluid within the container to be released before the container pressure becomes ineffective to force expansion (or compression) of the sealing member away from a sealing contact with the plug member to achieve fluid communication between the container and the valve chamber.

Figure 5:
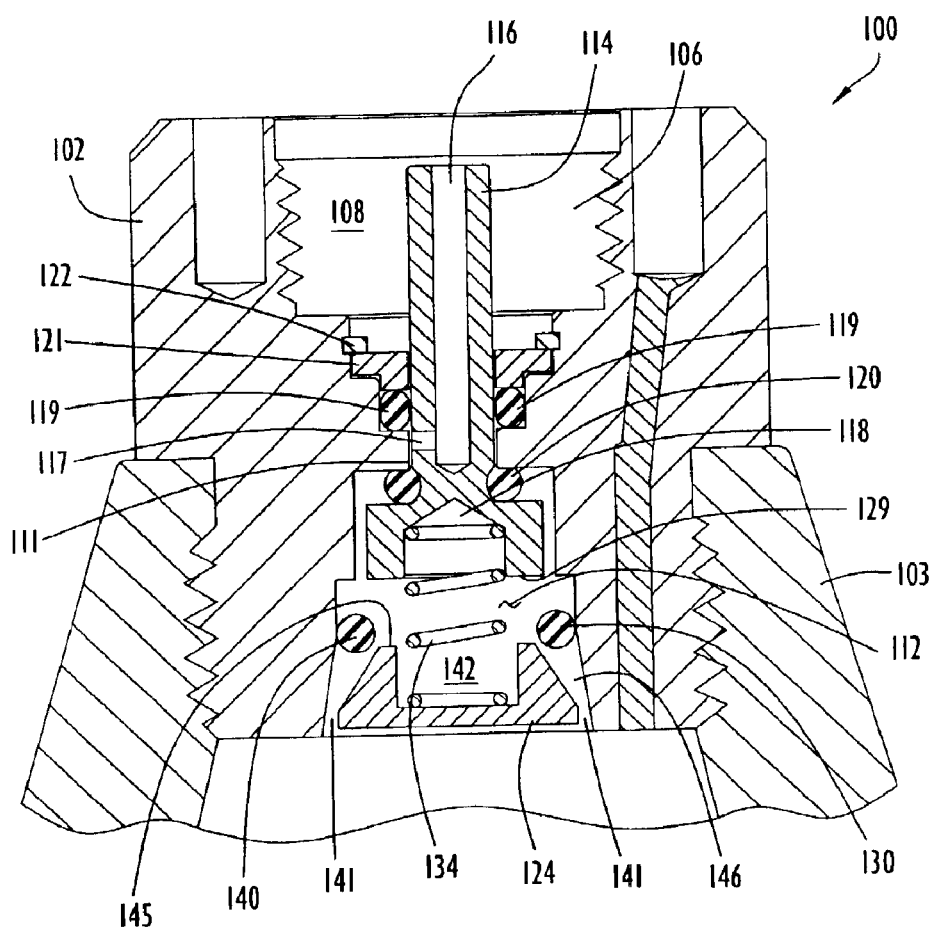
FIG. 5 is a cross-sectional view of another embodiment of a non-refillable valve device in accordance with the present invention.

An alternative embodiment of a valve device is illustrated in FIGS. 5–8. In this embodiment, the check valve mechanism facilitates one-way fluid flow from the container through the valve device by radial compression, rather than expansion, of a resilient elastic sealing member as described below. Referring to FIG. 5, valve device 100 includes a housing 102 that is substantially similar to the housing described above for the previous embodiment illustrated in FIG. 1. Housing 102 includes a central cavity 106 extending axially between the housing longitudinal ends, with an upper cavity section 108, an intermediate cavity section and a lower cavity section forming a chamber 112. The upper and intermediate cavity sections are substantially similar to the same cavity sections for the previous embodiment, with a sealing member 119 secured in the intermediate section by a retaining ring 121 and circlip 122. Valve housing 102 is secured within an opening in container 103 in a substantially similar manner as described in the previous embodiment, with external threads disposed on the housing lower section engaging with internal threads on the container opening.

Chamber 112 includes an upper chamber section extending from the bottom surface of annular shoulder 111 to a lower chamber section. The lower chamber section is larger in dimension than the upper chamber section and extends to the bottom surface of housing 102, with the transverse cross-sectional dimension (e.g., diameter) of the lower chamber section being greater at the housing bottom surface than at the interface with the upper chamber section. In particular, the transverse cross-sectional dimension of the lower chamber section remains relatively constant as the lower chamber section extends longitudinally from the upper chamber section to a ridge point 140 within the lower chamber section. At the ridge point, the lower chamber section begins to gradually increase in transverse cross-sectional dimension toward the housing bottom surface, defining a peripheral sloping wall for the lower chamber section that extends at an acute angle from an imaginary vertical line projected from the ridge point which is collinear with the lower chamber peripheral wall disposed above the ridge point.

Valve stem 114 is substantially similar to the valve stem described above for the previous embodiment and includes a cylindrical upper portion extending through the intermediate cavity section and into upper cavity section 108, with a central passage 116 and valve stem port 117 being disposed in valve stem 114 to permit fluid flow into and out of chamber 112. The lower portion of valve stem 114 is larger in transverse cross-sectional dimension than the upper portion as well as the radial gap or cavity space defined by annular shoulder 111. In addition, a resilient sealing member 120 is disposed in chamber 112 and secured about an outer peripheral groove of the valve stem located between valve stem port 117 and the valve stem lower portion. Sealing member 120 provides a fluid tight seal at the interface between chamber 112 and the intermediate cavity section and valve stem port 117 (i.e., in a substantially similar manner as described above for the previous embodiment) when the valve stem is axially biased in a resting position as depicted in FIG. 5. The lower portion of the valve stem further includes a central hollow portion 118 that extends axially into the valve stem from the valve stem bottom surface and terminates before reaching central passage 116.

The check valve mechanism of valve device 100 includes a plug member 124 that is secured within the lower section of chamber 112. Plug member 124 is held within the lower chamber section by securing lower portions of the plug member to selected peripheral wall sections of the lower chamber section (e.g., by welding). However, other lower portions of the plug member remain unattached and removed from other peripheral wall sections of the chamber lower section so as to establish one or more fluid communication paths 141 extending between chamber 112 and the opening at the housing bottom surface. A hollow portion 142 extends axially from a top surface of plug member 124 to a selected terminal location within the plug member. The hollow portion of the plug member is axially aligned within chamber 112 with hollow portion 118 of valve stem 114, and a resilient biasing member 134 extends into each of these hollow portions to contact the valve stem and the plug member so as to bias the valve stem toward the intermediate cavity section as depicted in FIG. 5. In this biased position, sealing member 120 is forced against the bottom surface of annular shoulder 111 to effect a fluid tight seal between chamber 112 and valve stem port 117. The valve stem lower portion and the upper portion of the plug member are further suitably dimensioned such that, upon axial displacement the valve stem toward the plug member, annular wall 129 of the valve stem (which defines valve stem hollow portion 118) engages annular wall 145 of the plug member (which defines plug member hollow portion 142) to prevent further movement of the valve stem beyond the plug member.

The external transverse cross-sectional dimension (e.g., outer diameter) of plug member 124 gradually increases in a direction from the plug member top surface to a selected location proximate the plug member bottom surface. This increasing transverse cross-sectional dimension defines an outer peripheral sloping wall for the plug member that, combined with the sloping wall of the lower chamber section, establishes an annular space or gap 146 between the upper portion of the plug member and the lower chamber section that narrows in transverse cross-sectional dimension from the plug member top surface toward the plug member bottom surface.

An elastic resilient sealing member 130 is provided in the form of an O-ring in chamber 112 and is disposed at or above ridge point 140 within the lower chamber section prior to activation of the check valve mechanism. Sealing member 130 is sufficiently dimensioned such that, at or above ridge point 140, the sealing member is radially compressed within chamber 112. When valve stem 114 is axially displaced toward plug member 124 and reaches sealing member 130, annular wall 129 of the valve stem contacts and forces sealing member 130 to move along the peripheral sloping wall of the lower chamber section, eventually forcing the sealing member into annular gap 146 as described below.

Figure 6:
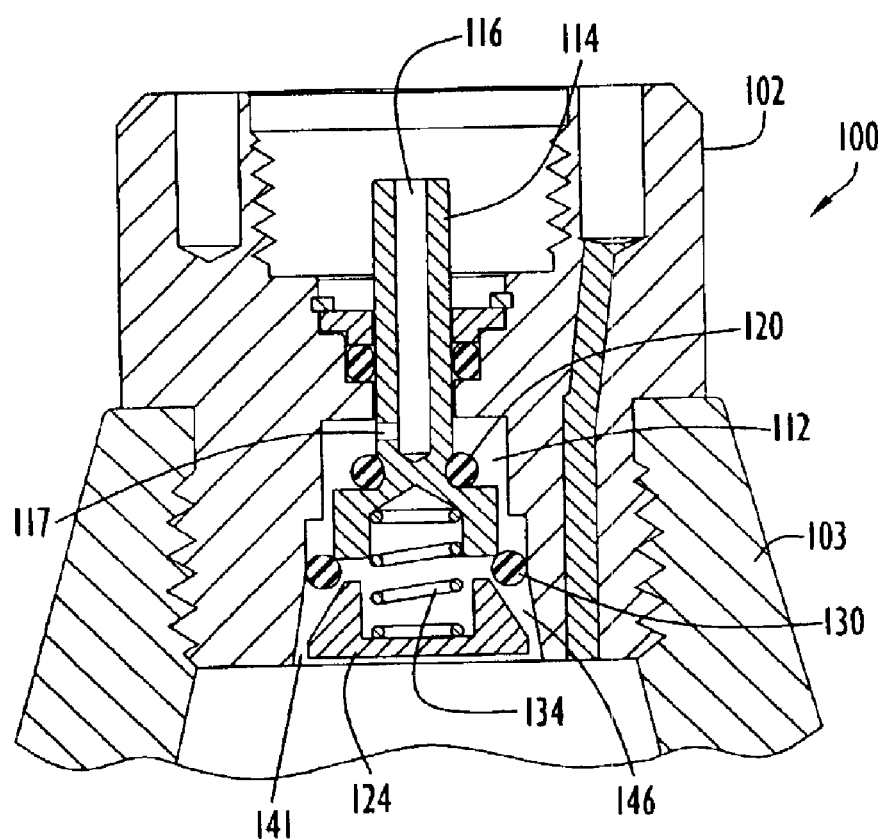
FIG. 6 is a cross-sectional view of the valve device of FIG. 5 with a valve stem of the device axially displaced to a position that permits filling of a fluid into a container connected with the valve device in accordance with the present invention.

Operation of valve device 100 is described with reference to FIGS. 5–8. Prior to actuation, valve stem 114 is biased by biasing member 134 to the resting position illustrated in FIG. 5, with sealing member 120 engaging the bottom surface of cavity shoulder 111 to prevent any fluid communication between valve stem port 117 and chamber 112. To fill the container, valve stem 114 is axially displaced a selected distance into chamber 112 by a suitable valve actuation device, thus compressing biasing member 134, to establish fluid communication between valve stem port 117 and chamber 112 (FIG. 6). It is noted that, at this axially displaced position, annular wall 129 of the valve stem either does not contact sealing member 130 or, alternatively, contacts and pushes the sealing member a short distance toward and/or into annular gap 146 while maintaining fluid communication with the interior of container 103. The container is filled by directing fluid through a passage in the actuation device and into valve stem passage 116, through valve stem port 117 and into chamber 112. From chamber 112, fluid flows past sealing member 130, through annular gap 146 and fluid communication paths 141 and into container 103.

Figure 7:
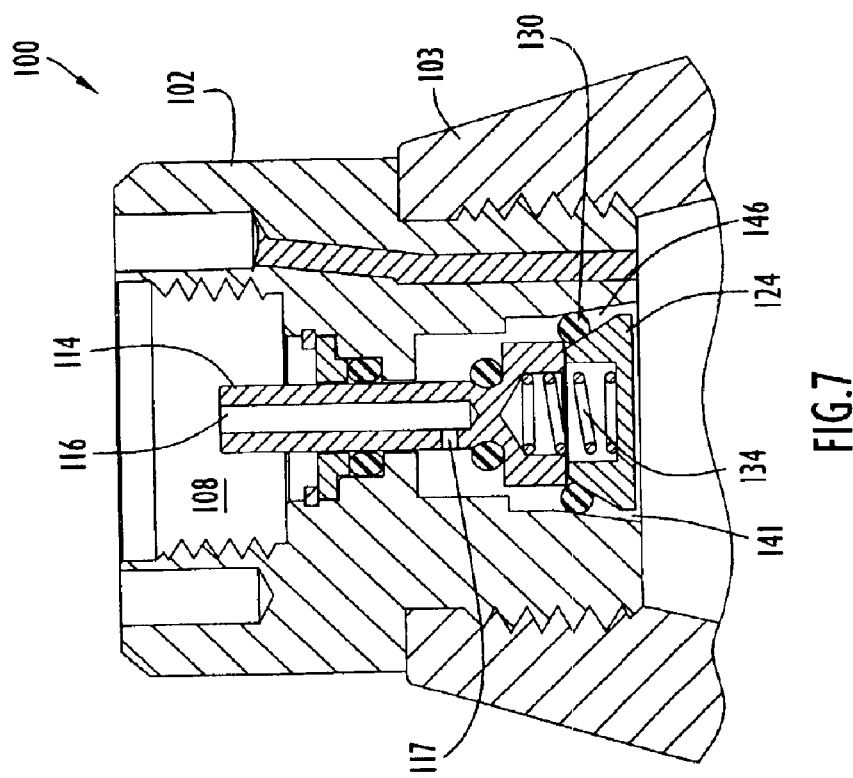
FIG. 7 is a cross-sectional view of the valve device of FIG. 5 with the valve stem axially displaced to a position that activates a check valve mechanism of the valve device in accordance with the present invention.

Once the container has been filled, valve stem 114 is further axially displaced toward plug member 124 so as to activate the check valve mechanism by pushing sealing member 130 from ridge point 140 downward along the peripheral sloping wall of the lower chamber section and into annular gap 146. Sealing member 130 radially expands within the increasing transverse cross-sectional dimension of the lower chamber section as it moves downward along the peripheral sloping chamber wall, substantially maintaining contact with the chamber wall. The valve stem continues to push sealing member 130 into annular gap 146 until annular wall 129 of the valve stem contacts annular wall 145 of the plug member (FIG. 7). At this point, sealing member 130 is sufficiently wedged between the lower chamber section wall and the plug member to provide an effective fluid tight seal that prevents fluid flow from chamber 112 into container 3. The valve stem is axially biased back to its original position (FIG. 5), as a result of the valve actuation device releasing the applied force to the valve stem and the biasing member biasing the valve stem away from the plug member, and a fluid tight seal between chamber 112 and valve stem port 117 is reestablished to prevent fluid from escaping the container.

Figure 8:
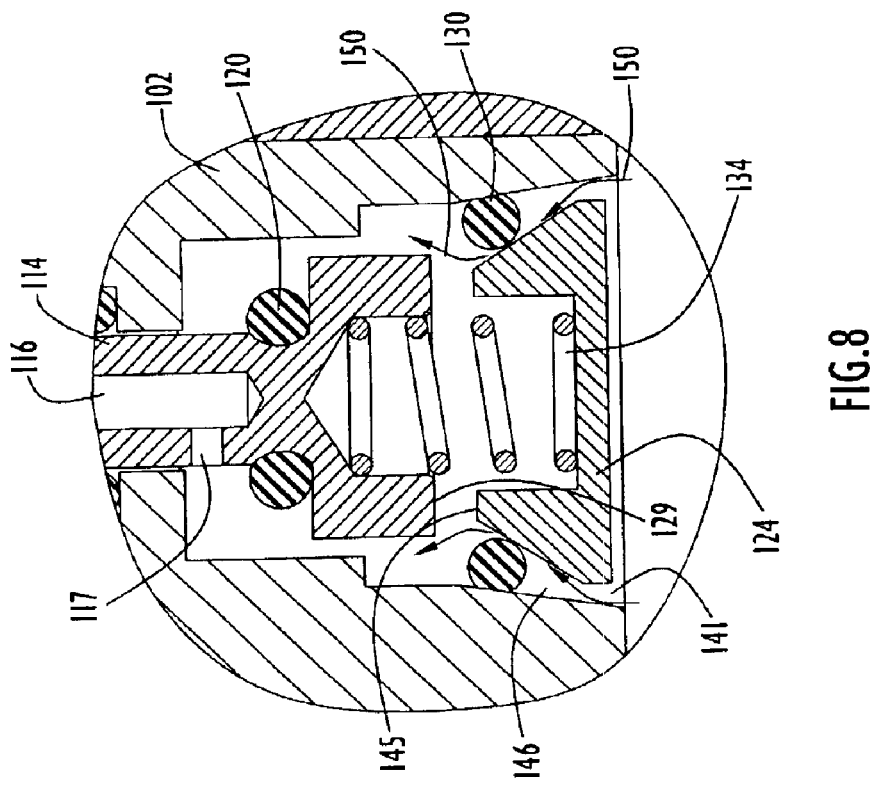
FIG. 8 is an enlarged view in cross-section of a portion of the valve device of FIG. 5 with the check valve mechanism activated and the valve stem displaced to a position that permits one-way flow of fluid from the container through the valve device.

Release of fluid from container 103 and through valve device 100 is established when valve stem 114 is axially displaced by the valve actuation device to a position where valve stem port 117 is in fluid communication with chamber 112 (FIG. 8). At this position, the pressure of fluid within the container forces sealing member 130 slightly upward within annular gap 146 along the peripheral sloping wall of the lower chamber section, causing the sealing member to become slightly radially compressed and to move away from and lose its fluid tight sealing contact with the outer peripheral sloping wall of plug member 124. Fluid escapes from the container, flows through fluid communication paths 141 and into annular gap 146, where the fluid then passes between sealing member 130 and plug member 124 (as generally indicated by arrows 150 in FIG. 8) and continues through chamber 112 to valve stem port 117. Fluid entering the valve stem port flows through valve stem passage 116 and the corresponding passage of the valve actuation device to the desired delivery destination for the fluid.

In contrast, once sealing member 130 is disposed within annular gap 146, refilling of container 103 is effectively prevented. Any fluid forced into chamber 112 presses against sealing member 130 to further wedge the sealing member into the annular gap, resulting in the sealing member radially expanding and pressing tightly against both the peripheral sloping wall of the lower chamber section and the peripheral sloping wall of the plug member.

Thus, the valve devices described above provide a simple check valve mechanism to prevent refilling of a container that requires fewer valve components to effect operability of the valve device. The check valve mechanism employs an elastic sealing member that is either radially compressed or expanded to effect one way flow of fluid from the container through the valve. As previously noted, any suitable types of fluids (e.g., gas or liquid) may be delivered to and from a container utilizing the valve device of the present invention. Further, any conventional or other suitable type of valve actuation device may be employed to effect operation of the valve device to delivery fluid from the container in any suitable manner.

Having described novel non-refillable valve devices and methods of using such valve devices, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A non-refillable valve device comprising:
   a housing including an axially extending internal cavity, the internal cavity including a chamber extending to an end of the housing, the housing being securable to a container to facilitate fluid communication between the container and the housing chamber;
   a plug member secured within the housing chamber to provide a fluid flow passage between the container and the housing chamber when the housing is secured to the container; and
   an elastic sealing member disposed within the chamber, the sealing member being displaceable from a first position to a second position within the chamber;
   wherein the sealing member in the first position permits fluid flowing into the valve device to flow through the fluid flow passage and into the container, and the sealing member in the second position substantially prevents fluid flow through the fluid flow passage and into the container, and wherein fluid pressure exerted on the sealing member in the second position causes the sealing member to expand to permit fluid flow through the fluid passage from the container to the housing chamber.

2. The valve device of claim 1, wherein the sealing member comprises an O-ring.

3. The valve device of claim 2, wherein the sealing member in the second position permits fluid flowing from the container to flow through the fluid flow passage and into the housing chamber.

4. The valve device of claim 3, wherein fluid pressure exerted on the sealing member in the second position causes the sealing member to compress to permit fluid flow through the fluid passage from the container to the housing chamber.

5. The valve device of claim 1, further comprising:
   a valve stem secured and axially displaceable within the internal cavity of the housing, wherein the valve stem moves the sealing member from the first position to the second position.

6. The valve device of claim 5, further comprising:
   a biasing member to bias the valve stem within the internal cavity in a direction away from the plug member.

7. The valve device of claim 5, wherein the fluid flow passage includes an annular gap defined between the plug member and a peripheral wall section of the housing chamber that surrounds the plug member, and the sealing member is movable by the valve stem into the annular gap to achieve the second position.

8. A method of filling and releasing fluid from a container utilizing a non-refillable valve device, the valve device including an axially extending internal cavity with a chamber extending to an end of the housing, a sealing member disposed within the chamber, and a plug member disposed within the housing chamber and configured to define a fluid flow path from the housing end into the housing chamber, the method comprising:

(a) securing the valve device to the container such that container is in fluid communication with the housing chamber via the fluid flow path;
(b) filling the container by delivering fluid through the internal cavity of the housing to the housing chamber, past the sealing member and through the fluid flow path;
(c) preventing refilling of the container by moving the sealing member from a first position within the housing chamber to a second position that substantially prevents fluid flow through the fluid flow passage and into the container; and
(d) releasing fluid from the container, wherein fluid pressure exerted on the sealing member in the second position causes the sealing member to expand to permit fluid flow through the fluid passage from the container to the housing chamber.

9. The method of claim 8, wherein the sealing member comprises an O-ring.

10. The method of claim 8, wherein the valve device further includes a valve stem secured within the internal cavity of the housing, and (c) includes:
   (c.1) axially displacing the valve stem within the internal cavity to move the sealing member from the first position to the second position.

11. The method of claim 10, further comprising:
   (d) biasing the valve stem within the internal cavity in a direction away from the plug member.

12. The method of claim 10, wherein the fluid flow passage includes an annular gap defined between the plug member and the chamber periphery surrounding the plug member, and (c.1) includes:
   (c. 1.1) moving the sealing member, via the valve stem, into the annular gap to achieve the second position.

13. A non-refillable valve device comprising:
   a housing including an axially extending internal cavity, the internal cavity including a chamber extending to an end of the housing, the housing being securable to a container to facilitate fluid communication between the container and the housing chamber;
   a plug member secured within the housing chamber to provide a fluid flow passage between the container and the housing chamber when the housing is secured to the container;
   an elastic sealing member disposed within the chamber, the sealing member being displaceable from a first position to a second position within the chamber; and
   a valve stem secured and axially displaceable within the internal cavity of the housing, wherein the valve stem moves the sealing member from the first position to the second position;
   wherein the sealing member in the first position permits fluid flowing into the valve device to flow through the fluid flow passage and into the container, and the sealing member in the second position substantially prevents fluid flow through the fluid flow passage and into the container, and wherein the sealing member extends around an outer peripheral section of the plug member and is displaceable along the plug member between the first and second positions, the fluid flow passage includes a port disposed on the outer peripheral section of the plug member and extending to a passage defined within the plug member, and the sealing member covers the port in the second position.

14. A method of filling and releasing fluid from a container utilizing a non-refillable valve device, the valve device including an axially extending internal cavity with a chamber extending to an end of the housing, a sealing member disposed within the chamber, and a plug member disposed within the housing chamber and configured to define a fluid flow path from the housing end into the housing chamber, the method comprising:

(a) securing the valve device to the container such that container is in fluid communication with the housing chamber via the fluid flow path;

(b) filling the container by delivering fluid through the internal cavity of the housing to the housing chamber, past the sealing member and through the fluid flow path;

(c) preventing refilling of the container by moving the sealing member from a first position within the housing chamber to a second position that substantially prevents fluid flow through the fluid flow passage and into the container; and (d) releasing fluid from the container, wherein fluid pressure exerted on the sealing member in the second position compresses the sealing member to permit fluid flow through the fluid flow passage from the container to the housing chamber.

15. A method of filling and releasing fluid from a container utilizing a non-refillable valve device, the valve device including an axially extending internal cavity with a chamber extending to an end of the housing, a sealing member disposed within the chamber, and a plug member disposed within the housing chamber and configured to define a fluid flow path from the housing end into the housing chamber, the method comprising:

(a) securing the valve device to the container such that container is in fluid communication with the housing chamber via the fluid flow path;

(b) filling the container by delivering fluid through the internal cavity of the housing to the housing chamber, past the sealing member and through the fluid flow path; and (c) preventing refilling of the container by moving the sealing member, via the valve stem, along the plug member from a first position within the housing chamber to a second position wherein the sealing member covers the port in the second position and substantially prevents fluid flow through the fluid flow passage and into the container;

wherein the sealing member extends around an outer peripheral section of the plug member, the fluid flow passage includes a port disposed on the outer peripheral section of the plug member and extending to a passage defined within the plug member.

16. A non-refillable valve device comprising:

a housing including an axially extending internal cavity, the internal cavity including a chamber extending to an end of the housing, the housing being securable to a container to facilitate fluid communication between the container and the housing chamber;

a means for plugging the housing chamber to provide a fluid flow passage between the container and the housing chamber when the housing is secured to the container; and a means for sealing the fluid flow passage to prevent fluid from flowing from the housing chamber to the container, the means for sealing being displaceable from a first position to a second position within the chamber;

wherein the means for sealing in the first position permits fluid flowing into the valve device to flow through the fluid flow passage and into the container, and the means for sealing in the second position substantially prevents fluid flow through the fluid flow passage and into the container but permits fluid flow from the container to the housing chamber by contracting or expanding the means for sealing when in the second position as a result of fluid pressure from the container being applied to the means for sealing.

17. A non-refillable valve device comprising:

a housing including an axially extending internal cavity, the internal cavity including a chamber extending to an end of the housing, the housing being securable to a container to facilitate fluid communication between the container and the housing chamber;

a plug member secured within the housing chamber to provide a fluid flow passage between the container and the housing chamber when the housing is secured to the container; and an elastic sealing member disposed within the chamber, the sealing member being displaceable from a first position to a second position within the chamber;

wherein the sealing member in the first position permits fluid flowing into the valve device to flow through the fluid flow passage and into the container, and the sealing member in the second position substantially prevents fluid flow through the fluid flow passage and into the container, and wherein fluid pressure exerted on the sealing member in the second position causes the sealing member to compress to prevent fluid flow through the fluid passage from the housing chamber to the container.

* * * * *